(12) United States Patent
Pachler et al.

(10) Patent No.: US 11,595,216 B2
(45) Date of Patent: Feb. 28, 2023

(54) ELECTRONIC APPARATUS AND METHOD FOR SIGNING A MESSAGE

(71) Applicant: Infineon Technologies AG, Neubiberg (DE)

(72) Inventors: Walther Pachler, Wetzelsdorf (AT); Andrea Hoeller, Graz (AT); Markus Moesenbacher, Thannhausen (AT)

(73) Assignee: Infineon Technologies AG, Neubiberg (DE)

( * ) Notice: Subject to any disclaimer, the term of this patent is extended or adjusted under 35 U.S.C. 154(b) by 85 days.

(21) Appl. No.: 16/673,249

(22) Filed: Nov. 4, 2019

(65) Prior Publication Data

US 2020/0145227 A1    May 7, 2020

(30) Foreign Application Priority Data

Nov. 5, 2018 (DE) .......................... 102018127529.3

(51) Int. Cl.
*H04L 9/32* (2006.01)
*G06Q 20/06* (2012.01)
*H04L 9/08* (2006.01)

(52) U.S. Cl.
CPC ....... *H04L 9/3247* (2013.01); *G06Q 20/0658* (2013.01); *H04L 9/0825* (2013.01); *H04L 9/3242* (2013.01); *H04L 2209/56* (2013.01)

(58) Field of Classification Search
CPC ............ G06Q 20/065; G06Q 20/0658; G06Q 20/3829; G06Q 20/40145; H04L 2209/38; H04L 2209/56; H04L 9/0825; H04L 9/14; H04L 9/3239; H04L 9/3242; H04L 9/3247
See application file for complete search history.

(56) References Cited

U.S. PATENT DOCUMENTS

| | | | |
|---|---|---|---|
| 6,209,091 B1* | 3/2001 | Sudia | G06Q 20/3821 705/76 |
| 8,364,967 B2* | 1/2013 | Sudia | H04L 9/085 713/180 |
| 10,068,228 B1* | 9/2018 | Winklevoss | H04L 9/085 |
| 10,102,510 B2* | 10/2018 | Yau | G06Q 20/3829 |
| 10,255,635 B1* | 4/2019 | Winklevoss | G06Q 40/04 |
| 10,325,257 B1* | 6/2019 | Winklevoss | G06Q 20/36 |
| 10,650,376 B1* | 5/2020 | Winklevoss | G06Q 20/065 |
| 10,929,929 B1* | 2/2021 | Winklevoss | G06Q 40/04 |
| 10,984,470 B1* | 4/2021 | Winklevoss | G06Q 40/04 |
| 2002/0013898 A1* | 1/2002 | Sudia | G06Q 20/3829 380/278 |

(Continued)

FOREIGN PATENT DOCUMENTS

| DE | 102013218373 A1 | 3/2015 |
|---|---|---|
| DE | 202015009601 U1 | 7/2018 |

OTHER PUBLICATIONS

Search Query Report from IP.com (performed Apr. 22, 2019) (Year: 2021).*

(Continued)

*Primary Examiner* — Sharon S Lynch
(74) *Attorney, Agent, or Firm* — Banner & Witcoff Ltd.

(57) ABSTRACT

An electronic apparatus having a memory arrangement, which is configured to store a plurality of sets of private-key material, and a data processor, which is configured to sign a message in accordance with two or more sets of private-key material from the plurality of sets of private-key material.

16 Claims, 8 Drawing Sheets

(56) References Cited

U.S. PATENT DOCUMENTS

| | | | |
|---|---|---|---|
| 2009/0217034 A1* | 8/2009 | Sudia | G06Q 20/02 |
| | | | 380/279 |
| 2012/0198228 A1* | 8/2012 | Oberheide | H04L 63/126 |
| | | | 713/155 |
| 2015/0287026 A1* | 10/2015 | Yang | G06Q 20/3678 |
| | | | 705/69 |
| 2015/0324789 A1* | 11/2015 | Dvorak | H04W 12/06 |
| | | | 705/67 |
| 2016/0005032 A1* | 1/2016 | Yau | G06Q 20/3674 |
| | | | 705/69 |
| 2016/0098723 A1* | 4/2016 | Feeney | G06Q 20/065 |
| | | | 705/75 |
| 2016/0162897 A1* | 6/2016 | Feeney | H04L 9/3236 |
| | | | 705/71 |
| 2016/0203448 A1* | 7/2016 | Metnick | H04L 9/3247 |
| | | | 705/64 |
| 2016/0261411 A1* | 9/2016 | Yau | H04L 63/0869 |
| 2016/0275461 A1* | 9/2016 | Sprague | H04W 12/06 |
| 2016/0283941 A1* | 9/2016 | Andrade | G06Q 20/3829 |
| 2016/0330034 A1* | 11/2016 | Back | H04L 9/3255 |
| 2016/0358164 A1* | 12/2016 | Liao | G06Q 20/223 |
| 2017/0109735 A1* | 4/2017 | Sheng | H04L 9/3297 |
| 2017/0220815 A1* | 8/2017 | Ansari | G06Q 20/389 |
| 2017/0221052 A1* | 8/2017 | Sheng | G06Q 20/3829 |
| 2018/0191503 A1* | 7/2018 | Alwar | H04L 9/0637 |
| 2018/0218176 A1* | 8/2018 | Voorhees | H04L 9/3213 |
| 2018/0240107 A1* | 8/2018 | Andrade | G06Q 20/36 |
| 2019/0026485 A1* | 1/2019 | Ansari | G06F 21/645 |
| 2019/0034919 A1* | 1/2019 | Nolan | H04L 9/3239 |
| 2019/0034936 A1* | 1/2019 | Nolan | G06Q 20/42 |
| 2019/0035018 A1* | 1/2019 | Nolan | H04L 9/0637 |
| 2019/0149337 A1* | 5/2019 | Savanah | H04L 9/3252 |
| | | | 713/168 |
| 2019/0332691 A1* | 10/2019 | Beadles | G06F 16/27 |
| 2019/0378119 A1* | 12/2019 | Hyuga | H04L 9/3247 |
| 2020/0005282 A1* | 1/2020 | Kim | H04L 9/0894 |
| 2020/0027080 A1* | 1/2020 | Holland | H04L 9/50 |
| 2020/0065788 A1* | 2/2020 | Melika | H04W 4/16 |
| 2020/0090164 A1* | 3/2020 | Hyuga | H04L 9/3247 |
| 2020/0184095 A1* | 6/2020 | Ansari | G06F 21/6227 |
| 2020/0213113 A1* | 7/2020 | Savanah | H04L 9/304 |
| 2020/0274700 A1* | 8/2020 | Wright | H04L 9/0825 |
| 2020/0387896 A1* | 12/2020 | Tran | A42B 3/0433 |
| 2021/0042745 A1* | 2/2021 | Bartolucci | H04L 9/3239 |
| 2021/0083872 A1* | 3/2021 | Desmarais | G06Q 20/3829 |
| 2021/0160222 A1* | 5/2021 | Bartolucci | H04L 9/3247 |

OTHER PUBLICATIONS

Search Query Report from IP.com (performed Nov. 4, 2021) (Year: 2021).*

Search Query Report from IP.com (performed Jan. 28, 2022) (Year: 2022).*

Search Query Report from IP.com (performed May 18, 2022) (Year: 2022).*

Search Query Report from IP.com (performed Nov. 3, 2022) (Year: 2022).*

German Patent Office, Office Action issued for DE 102018127529. 3, 11 pgs., dated Sep. 6, 2019.

* cited by examiner

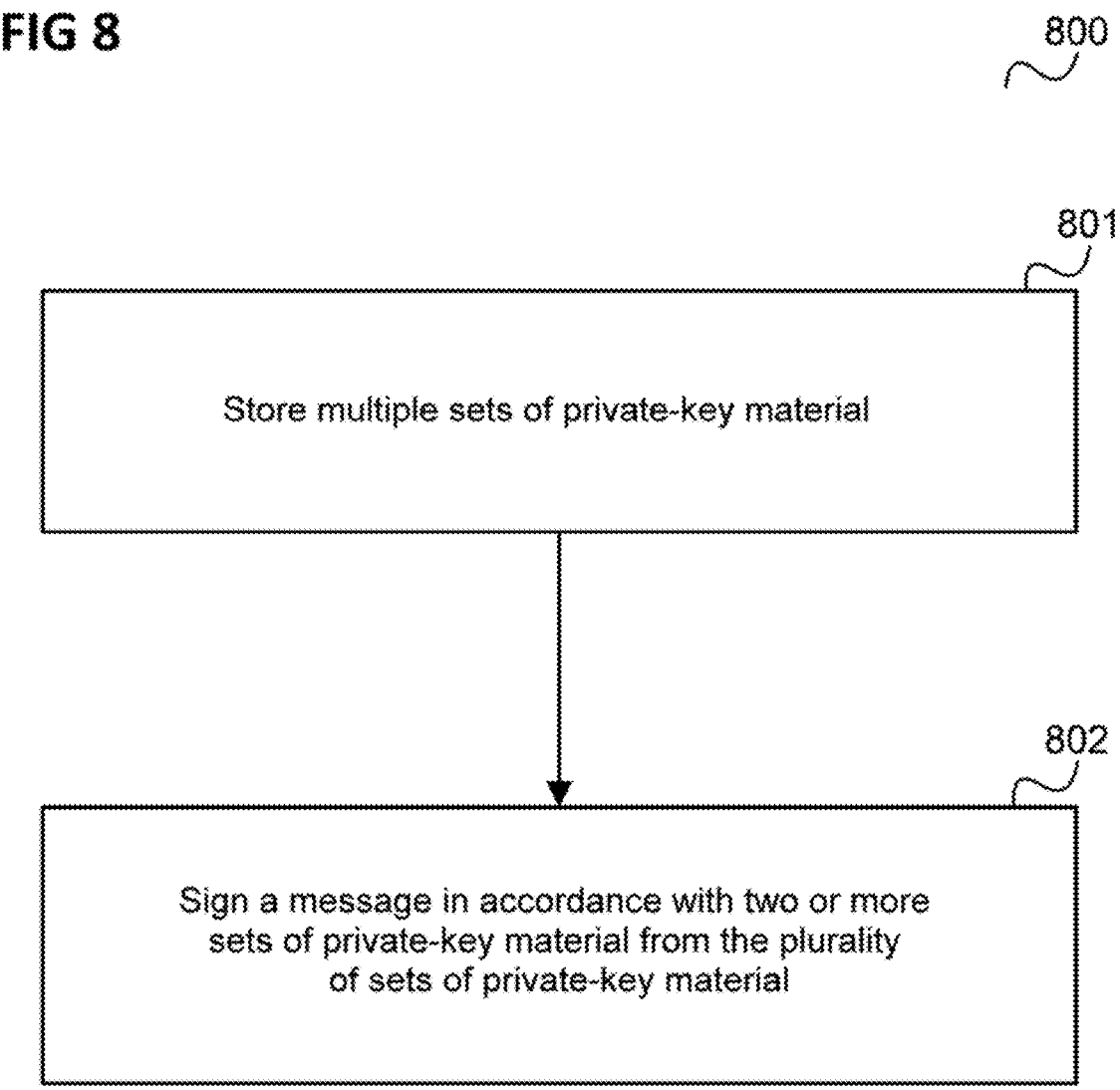

ELECTRONIC APPARATUS AND METHOD FOR SIGNING A MESSAGE

BACKGROUND

Exemplary embodiments relate in general to electronic apparatuses and methods for signing a message.

Cryptocurrencies are the best known application for blockchain technology. Access to a user's credit in the form of cryptocurrency such as for example Bitcoin is typically regulated by means of a private key. In order to be able to have credit at his disposal, i.e. to be able to perform a transaction in cryptocurrency from his credit, a user needs to sign the transaction using his private key. If the private key is lost, the user therefore also loses access to his credit. There is therefore a trade-off between keeping a key so that it is not lost (e.g. on a piece of paper, which at least cannot become inoperable like an electronic memory) and keeping the key so that no-one else has access thereto (e.g. in a manner encrypted in a security chip). Effective approaches are therefore desirable that allow private-key material, in particular for signing blockchain-based transaction messages, to be securely stored, securely being understood in this context to mean both securely against attacks and securely against loss.

SUMMARY

In accordance with one embodiment, an electronic apparatus is provided, having a memory arrangement, which is set up to store multiple sets of private-key material, and a data processing arrangement, which is set up to sign a message in accordance with two or more sets of private-key material from the plurality of sets of private-key material.

In accordance with a further embodiment, a method for signing a message in accordance with the electronic apparatus described above is provided.

BRIEF DESCRIPTION OF THE FIGURES

The figures do not reproduce the actual size ratios but rather are supposed to be used to illustrate the principles of the various exemplary embodiments. Various exemplary embodiments are described below with reference to the figures that follow.

FIG. 8 shows a flowchart illustrating a method for signing a message.

DETAILED DESCRIPTION

The detailed description that follows relates to the accompanying figures, which show details and exemplary embodiments. These exemplary embodiments are described in such detail that a person skilled in the art is able to carry out the details of the disclosure. Other embodiments are also possible and the exemplary embodiments can be changed from a structural, logical and electrical point of view without departing from the subject matter of the disclosure. The various exemplary embodiments do not necessarily exclude one another, but rather different embodiments can be combined with one another, so that new embodiments are obtained. Within the framework of this description, the terms "connected" and "coupled" are used to describe both a direct and an indirect connection and also a direct or indirect coupling.

Figure 1:
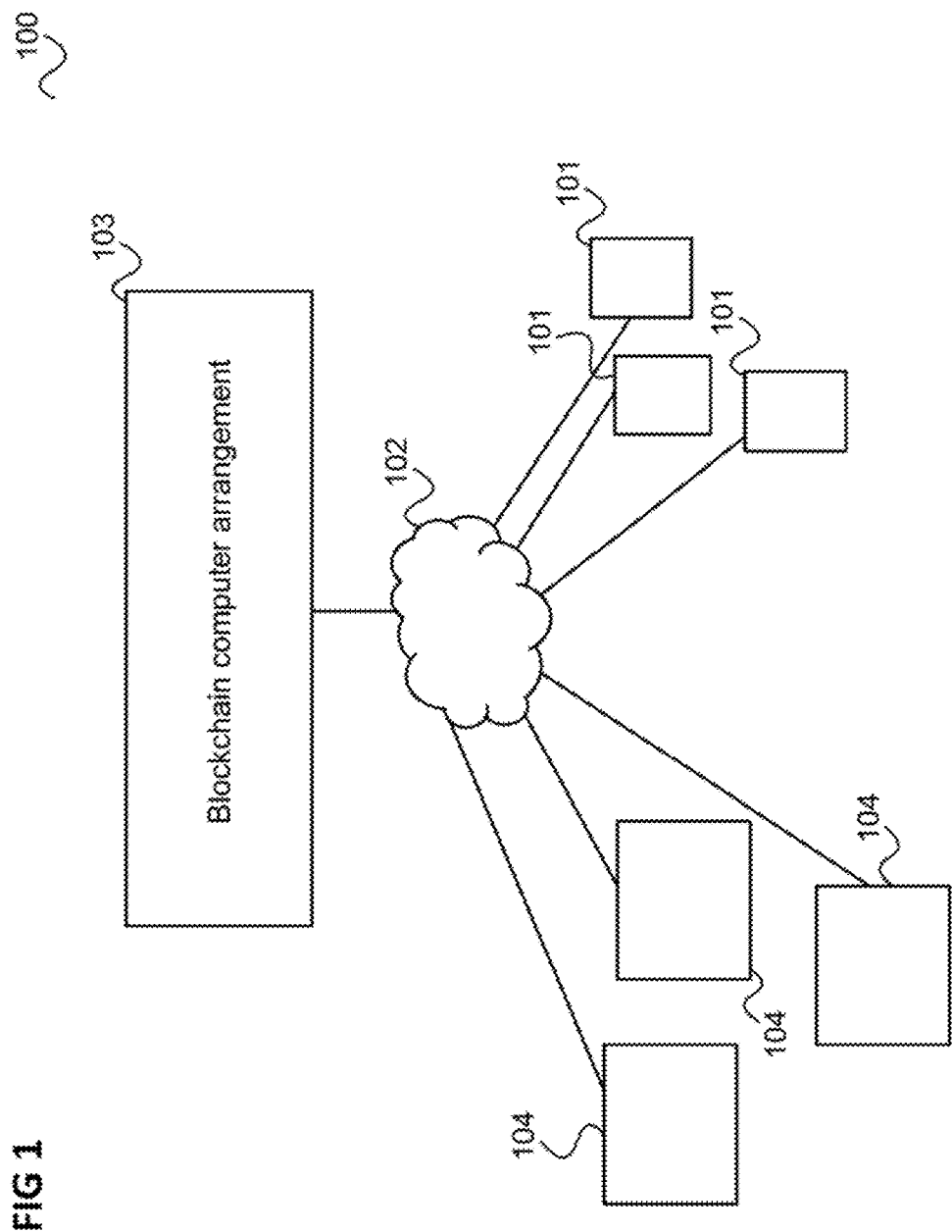
FIG. 1 shows a blockchain network, i.e., a computer network for managing and operating a blockchain.

FIG. 1 shows a blockchain network 100, i.e. a computer network for managing and operating a blockchain.

The blockchain network 100 can comprise one or more user terminals 101 and a blockchain (provider) computer arrangement 103 and one or more data processing computers 104. Each of these devices and computers can be communicatively coupled to one another via a communication network 102, such as for example the Internet, by using a suitable communication protocol.

A blockchain provider, e.g. the blockchain computer arrangement 103, can comprise one or more electronic devices set up to provide a blockchain functionality. The blockchain computer arrangement 103 can comprise a single device or multiple devices set up to maintain aspects of the blockchain.

A user terminal 101 can be used by a user to use the blockchain. By way of example, he can transfer an amount in a cryptographic currency (cryptocurrency) to another user. To do this, he performs a transaction, which is typically sent in the form of a message to the blockchain computer arrangement 103. The user terminal 101 can then be regarded as part of a (blockchain) transaction network. The blockchain computer arrangement 103 undertakes the verification of the transaction, for example, and inserts it into the blockchain.

An example of a user terminal that allows a user such a functionality is a hardware wallet. A hardware wallet is a specific type of cryptocurrency wallet that stores one or more cryptographic private keys of the user in a secure hardware apparatus.

In comparison with software wallets, hardware wallets have the advantage that private keys are typically stored in a protected area of a microcontroller and cannot be transferred out of the apparatus as plain text (i.e. in unencrypted fashion). Additionally, they are typically immune to computer viruses, which can be used to steal from software wallets. Hardware wallets can additionally be used securely and interactively and the private keys stored therein need never come into contact with possibly susceptible software. Furthermore, appropriate software allowing a user to validate the operation of the apparatus is typically available as open source.

Wallets have many different implementations that provide a backup option for hardware wallets. A standard way is to use a seed to generate a private key. This seed can later be used to generate the private key again if the wallet is broken or has been lost. BIP32 (Bitcoin Improvement Proposal 32) describes how addresses are generated from a seed for Bitcoin. This is effected by virtue of the seed being hashed. A new private key can be generated later by virtue of the first private key being hashed, and so on. It is therefore possible to generate a multiplicity of private keys from one seed. All of these keys can be reconstructed by using only this one seed.

So that a user does not lose his seed (and in particular thus his private key), because otherwise he is no longer able to access his possession of cryptocurrency, he can note down his seed on paper or else physically keep it in another way (e.g. using what is known as a cryptosteel, i.e. by means of metal-embossed characters arranged in an appropriate manner in a housing). Such approaches are by nature unsecure, however. Any reconstructing of private keys on a secure data processing apparatus (e.g. a microcontroller) by using elements that come from outside (the data processing apparatus) is subject to high security risk: if anyone obtains access to the seed of a user, he has full access to the associated cryptocurrency of the user (e.g. blockchain tokens, Bitcoins, etc.).

In accordance with various embodiments, an electronic apparatus is provided that stores multiple private keys itself and does not expose a secret (such as a private key) to access from outside. Robustness toward failure of a memory (e.g. of a chip) that stores a private key is achieved by virtue of multiple hardware chips being provided and a multisignature mechanism being used. This allows the breakdown or loss of a chip (and of a corresponding private key) to be compensated for without losing the possibility of signing and e.g. accessing an associated cryptocurrency credit. It is therefore possible for a backup option to be provided for a hardware wallet.

Figure 2:
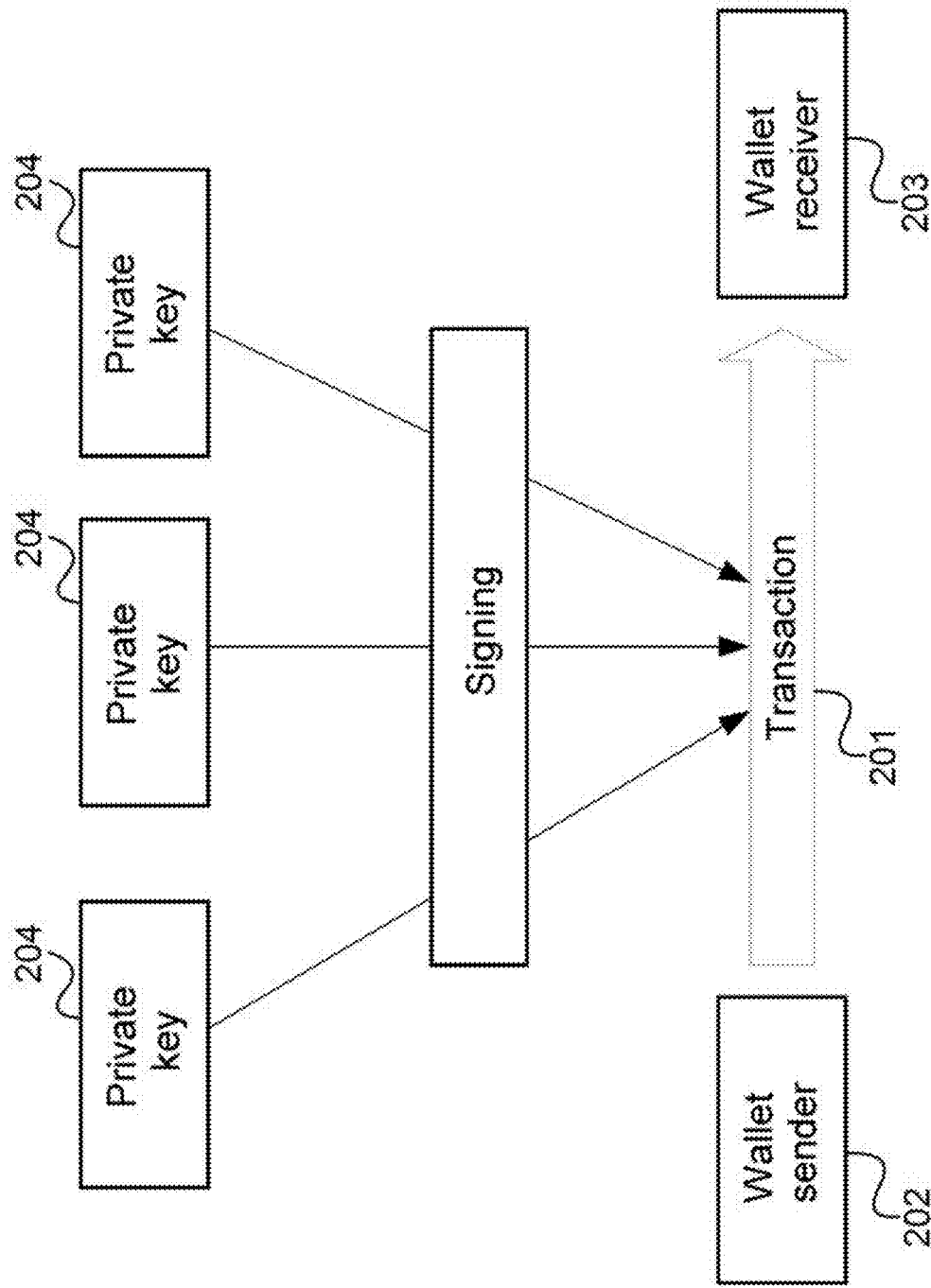
FIG. 2 illustrates a multisignature mechanism.

FIG. 2 illustrates a multisignature mechanism.

In accordance with the multisignature mechanism, a transaction 201 from a sender wallet 202 to a receiver wallet 203 is signed by means of some or all of multiple private keys 204, in this example three private keys 204. The transaction 201 is validly signed only if it is signed by means of a specific minimum number of the private keys 204.

The transaction is for example a transaction that is sent from a user terminal 101 (after signing) to the blockchain computer arrangement 103 in order to send a specific amount from a wallet implemented by the user terminal 101 to another user terminal 101 (and another wallet implemented thereby).

The private keys 204 can belong to different users, for example, and there can be a stipulation that all three users need to sign the transaction 201, so that for example only the different users in agreement can send an amount from their wallet 202.

It can also be sufficient for the transaction 201 to be signed using a subset of the private keys 204 in order to be validly signed. By way of example, it can be sufficient for the transaction 201 to be signed using two of the three private keys 204 in order to be validly signed. In general, an n-of-m multiple signature requires a transaction (in general a message) to be signed by means of n of m private keys (where n is less than or equal to m) in order to be validly signed. The number of private keys required for validly signing a transaction is stipulated for example when generating an address associated with the respective wallet (for example a Bitcoin address).

The private keys can be distributed over various media. If a wallet requires a multiple signature (i.e. if it is a multisignature wallet), then by way of illustration the wallet is therefore also distributed over various media. By way of example, a portion of a wallet can thus be stored by means of a cloud-based service.

Figure 3:
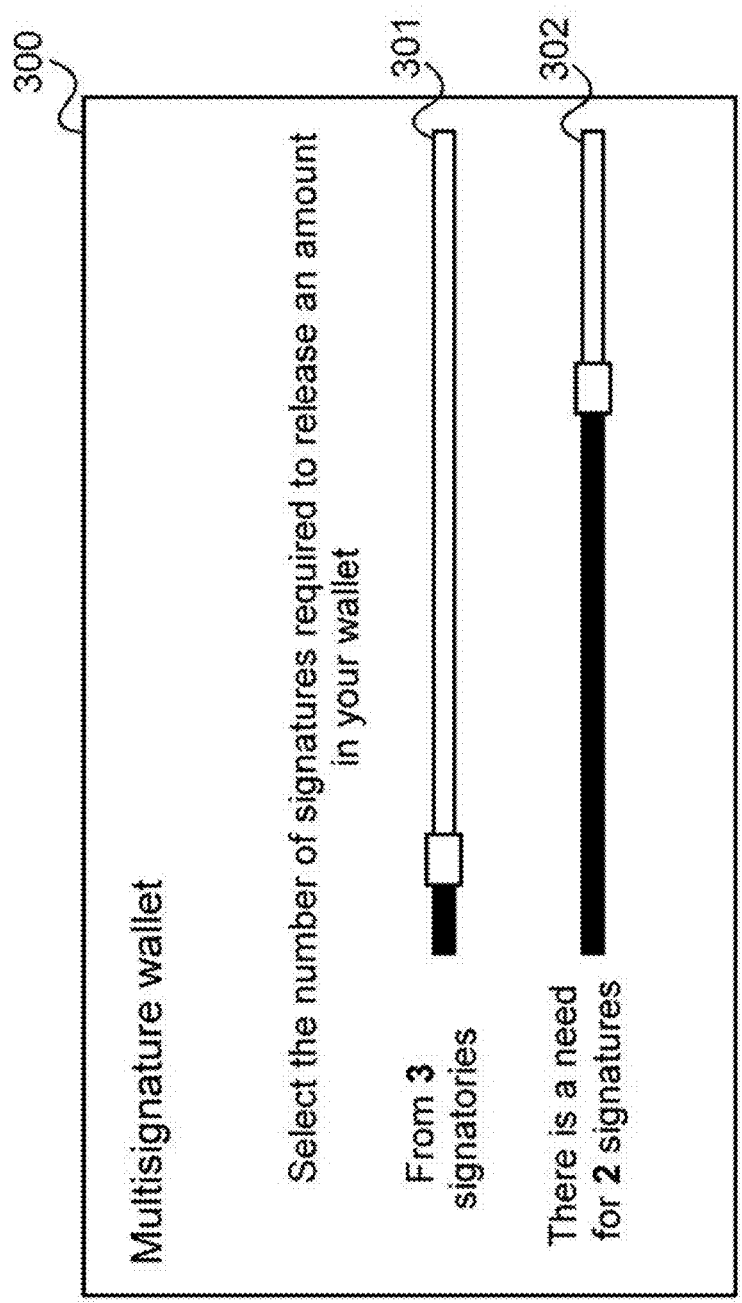
FIG. 3 shows a menu that a user can use to make settings for a multisignature mechanism.

In the case of a multisignature wallet, a user can generate multiple private keys, which are then required in order to validly sign a blockchain transaction, and is able to set for example how many of the private keys need to be used to sign a transaction in order to be validly signed, as depicted in FIG. 3.

FIG. 3 shows a menu 300 for a user that he can use to set how many private keys are supposed to be provided (first slider 301) and how many private keys therefrom need to be used for signing so that a transaction in cryptocurrency from the wallet is validly signed (second slider 302). The menu therefore permits the user to configure a multiple signature.

In accordance with various exemplary embodiments, a multisignature mechanism is mapped onto multiple chips (for example protected, i.e. secure, chips) of an electronic apparatus.

Figure 4:
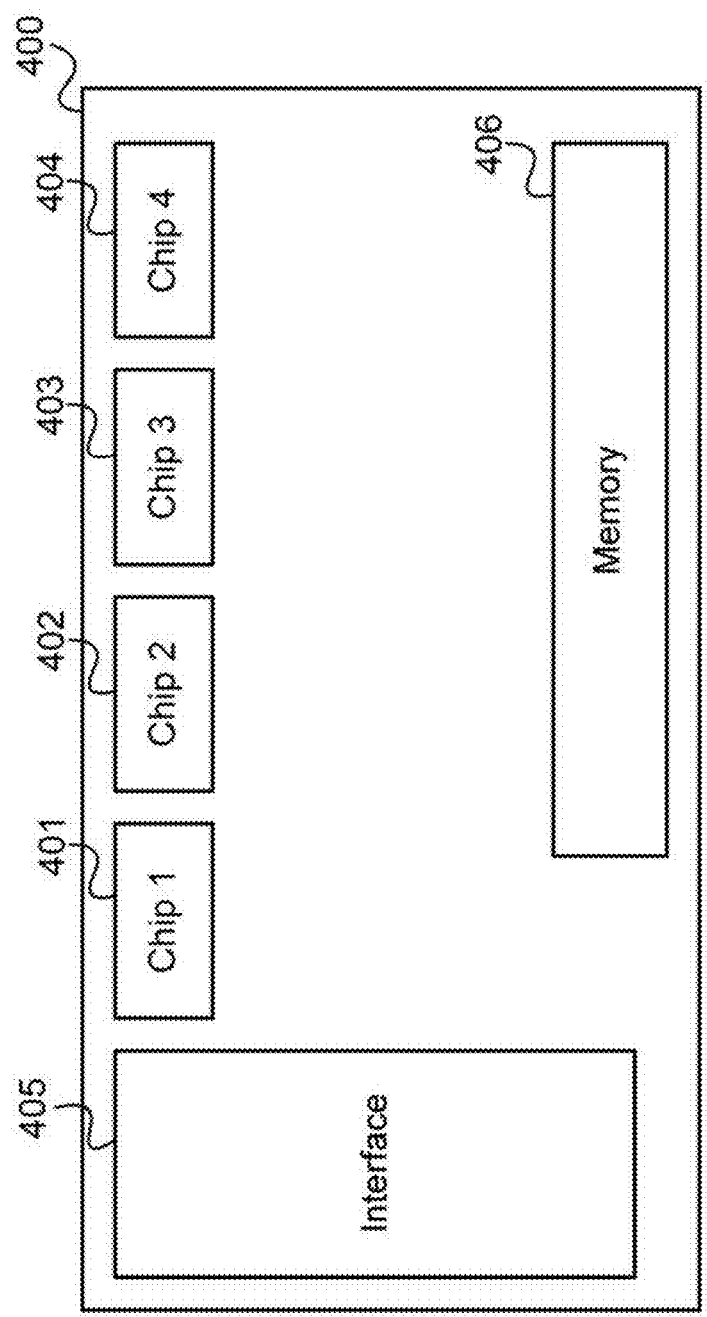
FIG. 4 shows a chip card having multiple chips.

FIG. 4 shows a chip card 400 having multiple chips 401-404.

In this example, the electronic apparatus is therefore a chip card 400, specifically a four-chip cryptocurrency card. The chip card 400 can have any form factor (that is to say for example standard credit card format or else a smaller format such as one of the various SIM card formats) and also serves only as an example. As such, the electronic apparatus can also be a different apparatus, for example a data processing apparatus, which is arranged in a housing, such as for example a hardware wallet housing, a mobile communication apparatus (for example a cell phone) or else a USB stick.

The number of chips 401-404 also serves merely as an example, and there can also be provision for more or fewer chips 401-404. The chip card 400 has a communication interface 405 by means of which it can be configured and by means of which it can receive messages (e.g. transactions) to be signed and by means of which it can send signed messages. The communication interface is an NFC (Near Field Communication) interface, for example.

Each of the chips 401-404 implements a security controller, for example.

To set up the chip card 400, the number of redundant chips 401-404 is stipulated and a multisignature wallet is generated (for example via the communication interface 405 by means of an apparatus such as a cell phone (as a platform) in which the chip card 400 is arranged). Each chip 401-404 is then provided with a pair comprising a private key and a public key (for example each chip 401-404 generates such a pair itself) and the public keys are collected (for example by the chip card 400). A multisignature address for the multisignature wallet is then generated (e.g. by the platform), and also an applicable redeemScript, which allows an amount to be sent from the multisignature address.

Optionally, the chips 401-404 can verify the authenticity of the multisignature address. The redeemScript is stored for example on the chip card 400 (for example in a memory 406) and distributed over all chips 401-404 before a transaction is performed, so that the chips 401-404 can verify the authenticity of the address.

Figure 5:
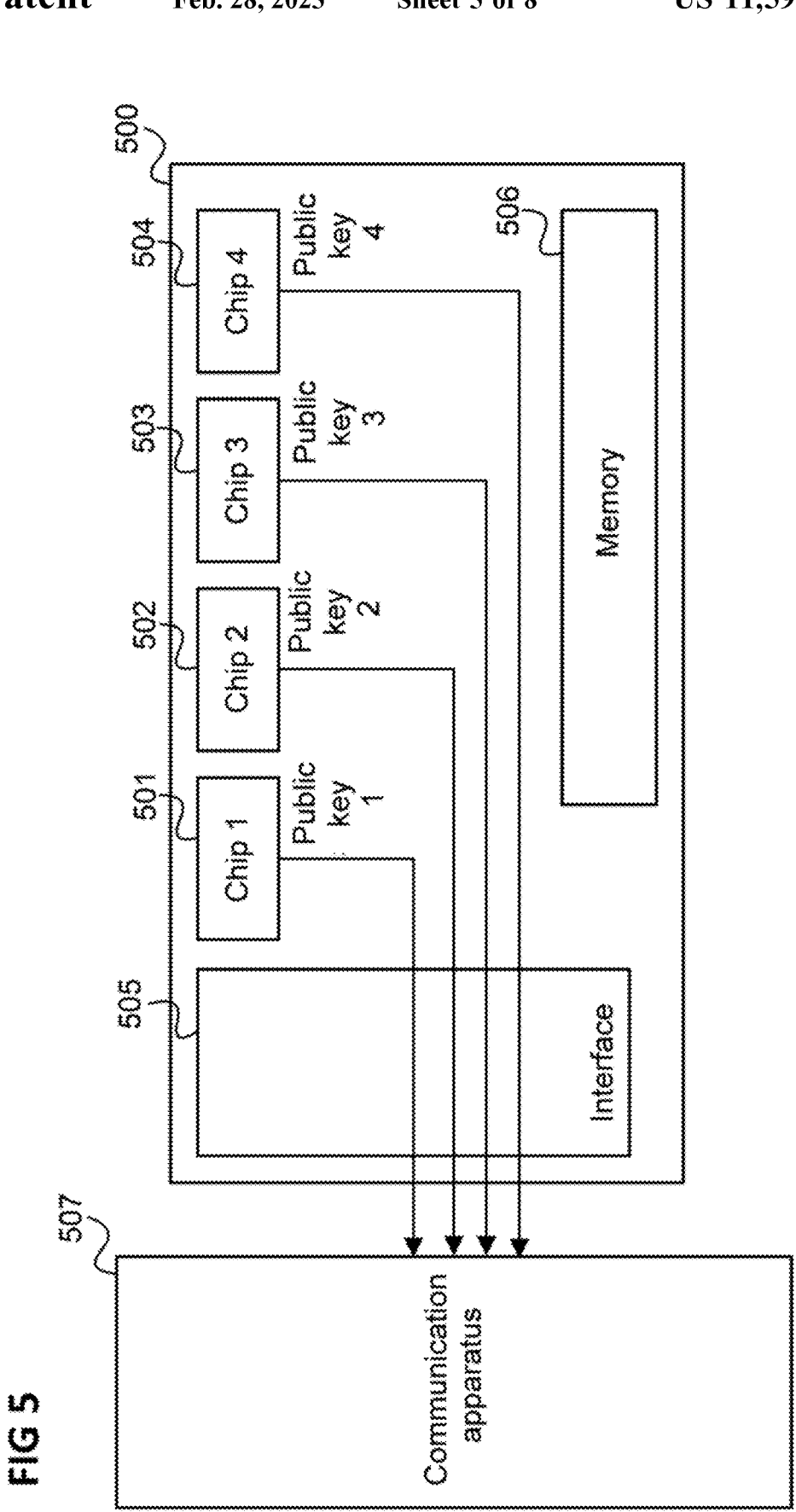
FIG. 5 shows an example in which there is provision for a chip card as described with reference to FIG. 4 in a communication apparatus.

FIG. 5 shows an example in which there is provision for a chip card 500 having chips 501-504 and communication interface 505 and memory 506, as described with reference to FIG. 4, in a communication apparatus 507. The chips 501-504 use the communication interface 505 to transmit their public keys (in accordance with their respective key pairs), and the communication apparatus 507 (for example a cell phone corresponding to one of the user terminals 101) generates therefrom a multisignature address that it announces for example in the blockchain network 100, e.g. other user terminals 101. The communication apparatus 507 then implements a multisignature wallet having the generated multisignature address.

The communication apparatus 507 is configured such that it implements an n-of-m multisignature wallet. If one of the chips 401-404 fails, then the chip card 400 continues to be able to validly sign transactions. In this case, it is assumed that each chip 401-404 stores its own private key (that is to say the private key in accordance with which it provides its signature), so that it can continue to provide its signature (i.e., it is part of the multiple signature) in the event of failure of one or more of the other chips 401-404.

Figure 6:
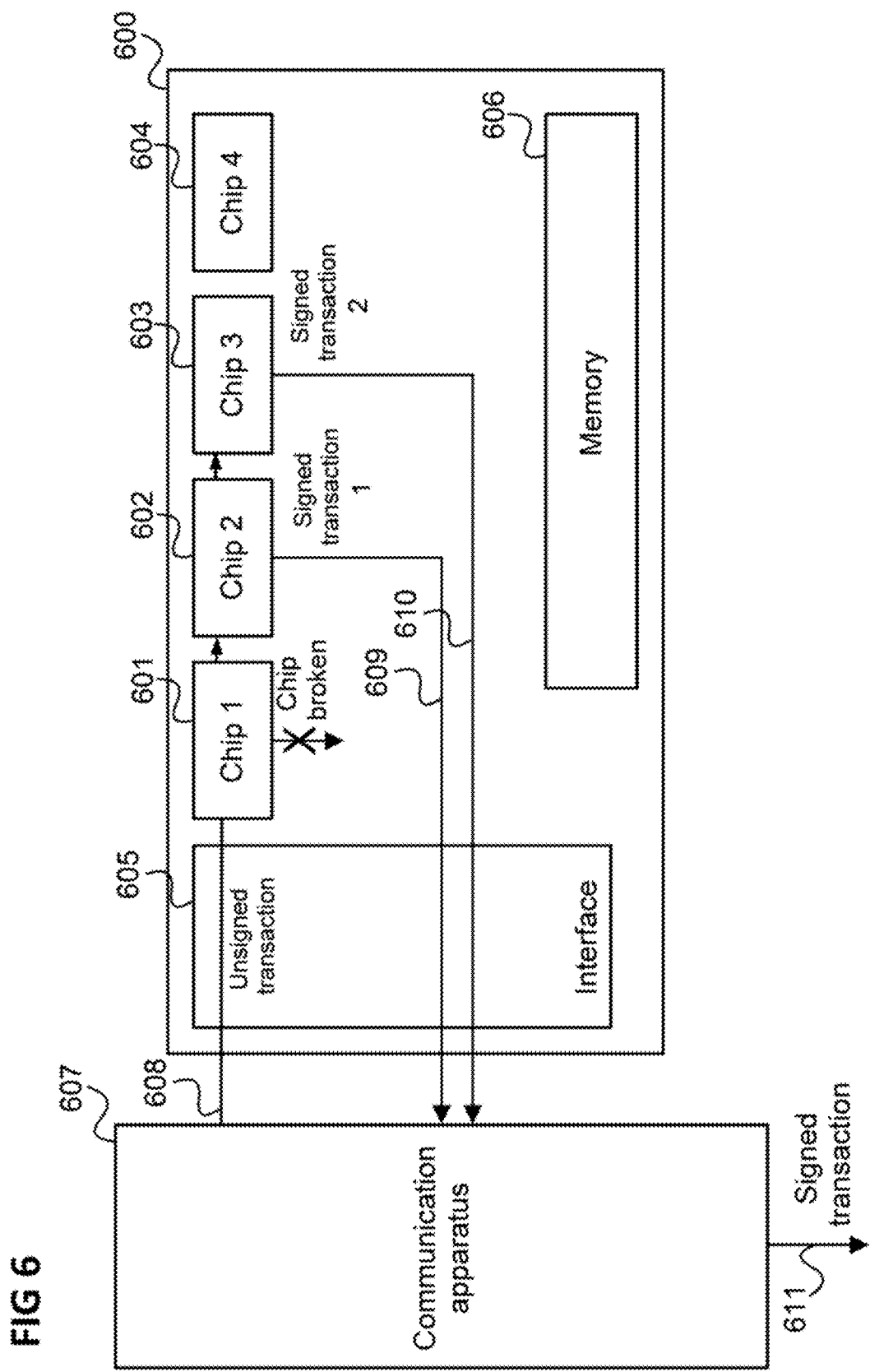
FIG. 6 shows an example in which there is provision for a chip card as described with reference to FIG. 5 in a communication apparatus, one of the chips having failed.

FIG. 6 shows an example in which there is provision for a chip card 600 having chips 601-604 and communication interface 605 and memory 606, as described with reference to FIG. 5, in a communication apparatus 607, the first chip 601 having failed.

The communication apparatus 607 operates as a multi-signature wallet and wants to send a transaction to the blockchain computer arrangement 103. This requires the transaction to be signed, which is the task of the chip card 600.

Communication apparatus 607 therefore supplies the raw (i.e. unsigned) transaction to the chip card 600 in 608. In this example, it is assumed that the communication apparatus 607 implements a 2-of-4 multisignature wallet. This means that it is sufficient for validly signing the transaction if two of the chips 601-604 sign the transaction. In this example, the first chip 601 is inoperable and accordingly cannot sign the transaction. The second chip 602 and the third chip 603 are operable, however, and can sign the transaction. The communication interface 605, to this end, distributes the unsigned transaction over the second chip 602 and the third chip 603, for example. There can also be a control device present in the chip card 600, which ascertains which chips are operable and controls the communication interface such that it distributes the unsigned transaction over two (or in general n) chips. The control device can then control the chips over which the unsigned transaction was distributed in order to sign the unsigned transaction, e.g. can send an appropriate command to these chips.

In 609 and 610, the chip card 600 hands over the versions of the transaction that are signed by the second chip 602 and by the third chip 603, forms the validly signed transaction therefrom and, in 611, transfers it to the blockchain computer arrangement 103. The communication apparatus 607 therefore obtains two signed versions of the transaction and forms therefrom a version of the transaction that is signed by the second chip 602 and by the third chip 603 by means of an appropriate combination of the two signed versions of the transaction.

Alternatively, the management of the signature generation (and also of the transaction) can be carried out on the chip card 600, i.e. the chip card 600 itself generates a version of the transaction that is signed by the second chip 602 and by the third chip 603 and hands over said version to the communication apparatus 607.

Despite failure of the first chip 601, the communication apparatus 607 or the chip card 600 generates a validly signed transaction. The chips 601-604 can intervene as backup chips if one or more other instances of the chips 601-604 have failed. In the example above, for example the third chip 603 can be regarded as a backup chip for the failed first chip 601.

The user of the chip card 600 can additionally be warned (for example by means of an appropriate display on the communication arrangement 606) that one of the chips 601-604 has become inoperable, so that he can react in good time and can replace the chip card 600 before more than two chips 601-604 are inoperable and the user is therefore no longer able to access his cryptocurrency. To this end, on detecting that one or more of the chips 601-604 have become inoperable (e.g. by means of a detection device of the chip card 600), the chip card 600 can output an alarm signal, e.g. to the communication arrangement 606.

The chips 401-404 can also be arranged (at least in part) on different chip cards 400. However, it should be indicated to the user in any case that a multisignature wallet is involved (for example on each transaction and whenever a wallet is generated). The user should always be informed of when there are backup chips and an n-of-m wallet configuration is used.

One embodiment is based on threshold signatures in accordance with an SSSS (Shamir Secret Sharing Scheme). In this case, a private key is stored in portions in order to increase security (and there is no single attack point for finding out the key). By way of example, three portions of the key are generated and a backup (i.e. a restoration) of the key is possible using two portions. The portions can be stored in different ways (for example as a VR code, password) or on different apparatuses. A message can be validly signed if a sufficient number of the portions of the private key (a number above the threshold) is available. The complete private key does not need to be constructed for this purpose. Similarly to when the multiple signature as described above is used, it is accordingly possible, in accordance with one embodiment, for portions of a private key to be distributed over multiple chips, so that each chip has one portion and a specific number of the chips is able to validly sign a message by virtue of each chip generating an applicable signature portion. The chips can thus in general store private-key material, each private-key material being a private key or, when a threshold signature is used, a portion of a private key.

Figure 7:
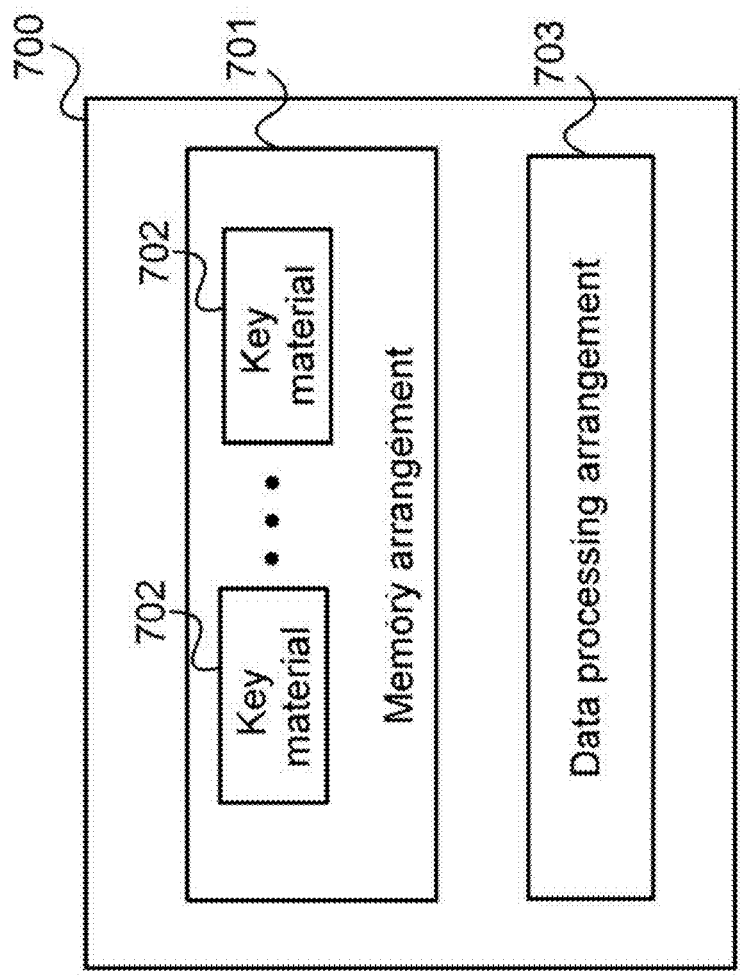
FIG. 7 shows an electronic apparatus.

In summary, in accordance with various embodiments, an electronic apparatus as depicted in FIG. 7 is provided.

FIG. 7 shows an electronic apparatus 700.

The electronic apparatus 700 has a memory arrangement 701. The memory arrangement 701 has for example one or more memory chips or else one or more memories that are arranged in various data processing chips.

The memory arrangement 701 is set up to store multiple sets of private-key material 702. Each set of private-key material 702 indicates a private key, for example. Each set of private-key material 702 can also indicate a portion of a private key, so that the sets of private-key material 702 together indicate a private key. In this case, a private key is understood to mean a private cryptographic key in accordance with asymmetric cryptography (e.g. RSA).

The electronic apparatus 700 further has a data processing arrangement 702 set up to sign a message in accordance with two or more sets of private-key material 702 from the plurality of sets of private-key material 702. The data processing arrangement 702 can be implemented by one or more chips that can also realize the memory arrangement at least in part.

In other words, in accordance with various embodiments, an electronic apparatus signs a message in accordance with various sets of key material, wherein it is able to generate a signed version of the message that is signed in accordance with multiple different key material sets, or else multiple signed versions of the message, each version being signed (only) using a respective key material set from the multiple key material sets.

The electronic apparatus has for example multiple chips, each chip being responsible for the signing in accordance with a key material associated with the chip.

In other words, the use of an n-of-m multiple signature (where n<m) and m (security) chips provides a redundancy in an apparatus for cryptographic signing. In the event of partial failure (of one or more security chips), there is therefore a backup option, since it is not necessary for all security chips to function. Additionally, there is no single point of failure and also no sole point of attack for an attacker. It is additionally also not necessary to distribute identical keys over redundant chips. Each chip can generate a key pair (without special measures) itself, on the other hand. There is also no need for communication between the chips.

Each chip has data processing components that allow the generation of a signature, for example a microprocessor (central processing unit), a main memory, registers, etc. The chips can be (completely) hardwired or at least partially programmable.

The chips can also be just memory chips that each store a set of private-key material. The generation of a signature can be effected by one or more further chips. If one or more of the memory chips fail, it is furthermore possible for a valid multiple signature to be generated so long as the number of operable memory chips is sufficient (i.e. is greater than or equal to n in the case of an n-of-m signature).

The electronic apparatus is used for example for a wallet for a cryptocurrency, the sets of private-key material being used for generating a multiple signature. The electronic apparatus is for example part of a larger apparatus (e.g. a communication apparatus such as a cell phone) that implements the wallet and signs transactions by means of the electronic apparatus. As a result of the signature generation distributed over multiple chips, the wallet is therefore distributed over multiple hardware chips by way of illustration. A user of the electronic apparatus can store further portions of the wallet (i.e. further keys for the multiple signature) as a further backup option outside the electronic apparatus in order to have a restoration option without exporting private keys from the electronic apparatus.

In accordance with one embodiment, the electronic apparatus securely stores key pairs for asymmetric cryptography, for example a key pair comprising a private key and a public key per hardware chip. Additionally, it performs secure signing by using cryptography on the basis of the stored key pairs.

The data processing arrangement 703 can be set up to progressively sign the message using the two or more sets of private-key material, i.e. for example such that it subsequently signs a message signed by means of a preceding set of private-key material using a succeeding set of private-key material. For example the data processing arrangement is set up to initially sign the message using a first of the sets of private-key material and to sign the message signed using the first set of private-key material using a second of the plurality of sets of private-key material.

Alternatively, the data processing arrangement can generate multiple signed versions of the message by signing using different key material. By way of example, it can sign the message using a first of the sets of private-key material from the plurality of sets of private-key material in order to create a first signed message and can sign the message using a second of the sets of private-key material in order to create a second signed message.

The data processing arrangement 703 can have multiple processors, each processor being set up to generate a respective signed version of the message that e.g. is not generated by any of the other processors.

Each processor is for example set up to sign the message using a respective set of private-key material from the plurality of sets of private-key material that none of the other processors uses to sign the message.

Each of the processors is implemented for example by a respective chip of the electronic apparatus (that implements none of the other processors).

The approach from FIG. 7 allows the reliability of an electronic apparatus that signs messages, for example a hardware wallet, to be increased without increasing the reliability of the individual components (i.e. for example the hardware chips that store the key material), which would typically be associated with higher costs.

The memory arrangement 701 can have multiple memory chips, each memory chip being set up to store a respective set of private-key material from the plurality of sets of private-key material (that is not stored by any of the other memory chips).

The electronic apparatus 700 can have a control device that is set up to ascertain a number of sets of private-key material in accordance with which the message is supposed to be signed and to control the data processing arrangement 703 such that it signs the message in accordance with the number of sets of private-key material. In this case, the control device is for example set up to ascertain the number of sets of private-key material in accordance with which the message is supposed to be signed on the basis of a ring signature configuration (e.g. a multisignature configuration or a threshold signature configuration).

The electronic apparatus 700 can further have a detection device that is set up to detect that the signing in accordance with one or more of the sets of private-key material by the data processing arrangement is limited (that is to say for example is not possible or at least is no longer trustworthy) and, on detecting that the signing in accordance with one or more of the sets of private-key material by the data processing arrangement is limited, to output an alarm signal.

In accordance with various embodiments, a method as depicted in FIG. 8 is carried out.

FIG. 8 shows a flowchart 800 illustrating a method for signing a message.

In 801, multiple sets of private-key material are stored.

In 802, the message is signed in accordance with two or more sets of private-key material from the plurality of sets of private-key material.

Various exemplary embodiments are indicated below.

Exemplary embodiment 1 is an electronic apparatus as depicted in FIG. 7.

Exemplary embodiment 2 is the electronic apparatus in accordance with exemplary embodiment 1, wherein each set of private-key material comprises a private key.

Exemplary embodiment 3 is the electronic apparatus in accordance with exemplary embodiment 1, wherein each set of private-key material comprises a portion of a private key.

Exemplary embodiment 4 is the electronic apparatus in accordance with one of exemplary embodiments 1 to 3, wherein the message represents a blockchain-based transaction message.

Exemplary embodiment 5 is the electronic apparatus in accordance with one of exemplary embodiments 1 to 4, wherein the message represents a transaction in an electronic currency.

Exemplary embodiment 6 is the electronic apparatus in accordance with one of exemplary embodiments 1 to 5, wherein the data processing arrangement is set up to progressively sign the message using the two or more sets of private-key material from the plurality of sets of private-key material.

Exemplary embodiment 7 is the electronic apparatus in accordance with one of exemplary embodiments 1 to 6, having a communication interface set up to output the progressively signed message.

Exemplary embodiment 8 is the electronic apparatus in accordance with exemplary embodiment 7, wherein the message represents a blockchain-based transaction message and the communication interface is set up to output the message to a component of a transaction network.

Exemplary embodiment 9 is the electronic apparatus in accordance with one of exemplary embodiments 1 to 5, wherein the data processing arrangement is set up to generate multiple signed versions of the message, wherein each version is signed using a different set of private-key material.

Exemplary embodiment 10 is the electronic apparatus in accordance with exemplary embodiment 9, having a communication interface set up to output the signed versions of the message.

Exemplary embodiment 11 is the electronic apparatus in accordance with exemplary embodiment 10, wherein the message represents a blockchain-based transaction message and the communication interface is set up to output the signed versions of the message to a component of a transaction network.

Exemplary embodiment 12 is the electronic apparatus in accordance with one of exemplary embodiments 9 to 11, wherein the data processing arrangement has multiple processors, wherein each processor is set up to generate a respective signed version of the message.

Exemplary embodiment 13 is the electronic apparatus in accordance with exemplary embodiment 12, having multiple chips, wherein each processor is implemented by a respective chip.

Exemplary embodiment 14 is the electronic apparatus in accordance with one of exemplary embodiments 9 to 13, wherein the data processing arrangement is set up to combine the signed versions of the message, so that it generates a message signed in accordance with the two or more sets of private-key material.

Exemplary embodiment 15 is the electronic apparatus in accordance with one of exemplary embodiments 1 to 14, having a communication interface set up to receive the message.

Exemplary embodiment 16 is the electronic apparatus in accordance with one of exemplary embodiments 1 to 15, wherein the memory arrangement has multiple memory chips, wherein each memory chip is set up to store a respective set of private-key material from the plurality of sets of private-key material.

Exemplary embodiment 17 is the electronic apparatus in accordance with one of exemplary embodiments 1 to 16, having a control device set up to ascertain a number of sets of private-key material in accordance with which the message is supposed to be signed and to control the data processing arrangement such that it signs the message in accordance with the number of sets of private-key material.

Exemplary embodiment 18 is the electronic apparatus in accordance with exemplary embodiment 17, wherein the control device is set up to ascertain the number of sets of private-key material in accordance with which the message is supposed to be signed on the basis of a ring signature configuration.

Exemplary embodiment 19 is the electronic apparatus in accordance with exemplary embodiment 17 or 18, wherein the control device is set up so as, if the signing in accordance with one or more of the sets of private-key material by the data processing arrangement is limited, to control the data processing arrangement such that it signs the message in accordance with other sets from the sets of private-key material.

Exemplary embodiment 20 is the electronic apparatus in accordance with one of exemplary embodiments 1 to 18, having a detection device set up to detect that the signing in accordance with one or more of the sets of private-key material by the data processing arrangement is limited and, on detecting that the signing in accordance with one or more of the sets of private-key material by the data processing arrangement is limited, to output an alarm signal.

Exemplary embodiment 21 is a method for signing a message as depicted in FIG. 8.

Exemplary embodiment 22 is the method in accordance with exemplary embodiment 21, wherein each set of private-key material comprises a private key.

Exemplary embodiment 23 is the method in accordance with exemplary embodiment 21, wherein each set of private-key material comprises a portion of a private key.

Exemplary embodiment 24 is the method in accordance with one of exemplary embodiments 21 to 23, wherein the message represents a blockchain-based transaction message.

Exemplary embodiment 25 is the method in accordance with one of exemplary embodiments 21 to 24, wherein the message represents a transaction in an electronic currency.

Exemplary embodiment 26 is the method in accordance with one of exemplary embodiments 21 to 25, involving successively signing the message using the two or more sets of private-key material from the plurality of sets of private-key material.

Exemplary embodiment 27 is the method in accordance with one of exemplary embodiments 21 to 26, involving outputting the progressively signed message.

Exemplary embodiment 28 is the method in accordance with exemplary embodiment 27, wherein the message represents a blockchain-based transaction message and the method involves outputting the message to a component of a transaction network.

Exemplary embodiment 29 is the method in accordance with one of exemplary embodiments 21 to 25, involving generating multiple signed versions of the message, wherein each version is signed using a different set of private-key material.

Exemplary embodiment 30 is the method in accordance with exemplary embodiment 29, involving outputting the signed versions of the message.

Exemplary embodiment 31 is the method in accordance with exemplary embodiment 30, wherein the message represents a blockchain-based transaction message and the method involves outputting the signed versions of the message to a component of a transaction network.

Exemplary embodiment 32 is the method in accordance with one of exemplary embodiments 29 to 31, involving generating a respective signed version of the message using a respective processor.

Exemplary embodiment 33 is the method in accordance with exemplary embodiment 32, wherein each processor is implemented by a respective chip.

Exemplary embodiment 34 is the method in accordance with one of exemplary embodiments 29 to 33, involving combining the signed versions of the message, so that a message signed in accordance with the two or more sets of private-key material is generated.

Exemplary embodiment 35 is the method in accordance with one of exemplary embodiments 21 to 34, involving receiving the message by means of a communication interface.

Exemplary embodiment 36 is the method in accordance with one of exemplary embodiments 21 to 35, involving storing a respective set of private-key material from the plurality of sets of private-key material by means of a respective memory chip.

Exemplary embodiment 37 is the method in accordance with one of exemplary embodiments 21 to 36, involving ascertaining a number of sets of private-key material in accordance with which the message is supposed to be signed and signing the message in accordance with the number of sets of private-key material.

Exemplary embodiment 38 is the method in accordance with exemplary embodiment 37, involving ascertaining the number of sets of private-key material in accordance with which the message is supposed to be signed on the basis of a ring signature configuration.

Exemplary embodiment 39 is the method in accordance with exemplary embodiment 37 or 38, involving signing the message in accordance with other sets from the sets of private-key material if the signing in accordance with one or more of the sets of private-key material by the data processing arrangement is limited.

Exemplary embodiment 40 is the method in accordance with one of exemplary embodiments 21 to 38, involving detecting that the signing in accordance with one or more of the sets of private-key material by the data processing arrangement is limited and, on detecting that the signing in accordance with one or more of the sets of private-key material by the data processing arrangement is limited, outputting an alarm signal.

In accordance with a further exemplary embodiment, a communication apparatus is provided that has multiple chips, wherein each chip is set up to sign a message by means of respective private-key material. The communication apparatus further has a transmitter that is set up to send a message signed by the multiple chips.

Although the details of the disclosure has been shown and described primarily with reference to specific embodiments, those familiar with the field of the art should understand that numerous changes concerning refinement and details can be made thereto without departing from the essence and scope of the disclosure as defined by the claims that follow. The scope of the disclosure is therefore determined by the appended claims, and the intention is for all changes that come under the literal meaning or fall within the range of equivalence of the claims to be encompassed.

LIST OF REFERENCE SIGNS

100 Blockchain network
101 User terminals
102 Communication network
103 Blockchain computer arrangement
104 Data processing computer
201 Transaction
202 Sender wallet
203 Receiver wallet
204 Private keys
300 Menu
301, 302 Slider
400 Chip card
401-404 Chips
405 Communication interface
406 Memory
500 Chip card
501-504 Chips
505 Communication interface
506 Memory
507 Communication apparatus
600 Chip card
601-604 Chips
605 Communication interface
606 Memory
607 Communication apparatus
608-610 Sequence steps
700 Electronic apparatus
701 Memory arrangement
702 Key material
703 Data processing arrangement
800 Flowchart
801, 802 Sequence steps

The invention claimed is:

1. An electronic wallet, comprising:
a memory arrangement configured to store a plurality of distinct sets of private-key material generated by the electronic wallet;
a data processing arrangement configured to sign a message in accordance with two or more sets of private-key material from the plurality of sets of private-key material, wherein the message represents a blockchain-based transaction message, and the data processing arrangement is further configured to generate a plurality of signed versions of the message, wherein each version of the signed versions is signed using a different set of private-key material and the signed versions of the message are combined so that the data processing arrangement generates a message signed in accordance with two or more sets of private-key material,
wherein the memory arrangement and the data processing arrangement are formed in a non-distributed configuration within the electronic wallet, and the data processing arrangement is configured such that the plurality of sets of private-key material are securely stored in a manner protected from access and use outside of the electronic wallet and are also protected against attacks; and
a controller configured to ascertain a plurality of sets of private-key material in accordance with which the message is supposed to be signed on the basis of a ring signature configuration, and to control the data processing arrangement such that the data processing arrangement signs the message in accordance with the plurality of sets of private-key material.

2. The electronic wallet as claimed in claim 1, wherein each set of private-key material comprises a private key.

3. The electronic wallet as claimed in claim 1, wherein each set of private-key material comprises a portion of a private key.

4. The electronic wallet as claimed in claim 1, wherein the message represents a transaction in an electronic currency.

5. The electronic wallet as claimed in claim 1, wherein the data processing arrangement is configured to progressively sign the message using the two or more sets of private-key material from the plurality of sets of private-key material.

6. The electronic wallet as claimed in claim 5, further comprising:
a communication interface configured to output the progressively signed message.

7. The electronic wallet as claimed in claim 6, wherein the communication interface is configured to output the message to a component of a transaction network.

8. The electronic wallet as claimed in claim 1, further comprising:

a communication interface configured to output the signed versions of the message.

9. The electronic wallet as claimed in claim 8, wherein the communication interface is configured to output the signed versions of the message to a component of a transaction network.

10. The electronic wallet as claimed in claim 1, wherein the data processing arrangement comprises a plurality of processors, wherein each processor is configured to generate a respective signed version of the message.

11. The electronic wallet as claimed in claim 10, further comprising:
a plurality of chips, wherein each processor is implemented by a respective chip.

12. The electronic wallet as claimed in claim 1, further comprising:
a communication interface configured to receive the message.

13. The electronic wallet as claimed in claim 1, wherein the memory arrangement comprises a plurality of memory chips, wherein each memory chip is configured to store a respective set of private-key material from the plurality of sets of private-key material.

14. The electronic wallet as claimed in claim 1, wherein the controller is configured, if the signing in accordance with one or more of the sets of private-key material by the data processing arrangement is limited, to control the data processing arrangement such that the data processing arrangement signs the message in accordance with other sets from the sets of private-key material.

15. The electronic wallet as claimed in claim 1, further comprising:
a detector configured to detect that the signing in accordance with one or more of the sets of private-key material by the data processing arrangement is limited and, upon detecting that the signing in accordance with one or more of the sets of private-key material by the data processing arrangement is limited, to output an alarm signal.

16. A method for signing a message by an electronic wallet, comprising:
storing, in a memory arrangement, a plurality of distinct sets of private-key material generated by the electronic wallet;
signing, by a data processing arrangement a message in accordance with two or more sets of private-key material from the plurality of sets of private-key material by the electronic wallet, wherein the message represents a blockchain-based transaction message;
generating, by the data processing arrangement, a plurality of signed versions of the message, wherein each version of the signed versions is signed using a different set of private-key material and the signed versions of the message are combined so that the data processing arrangement generates a message signed in accordance with the two or more sets of private-key material,
wherein the memory arrangement and the data processing arrangement are formed in a non-distributed configuration within the electronic wallet, and the plurality of sets of private-key material are securely stored in a manner protected from access and use outside of the electronic wallet and are also protected against attacks;
ascertaining, by a controller, a plurality of sets of private-key material in accordance with which the message is supposed to be signed on the basis of a ring signature configuration; and
controlling, by the controller, the data processing arrangement such that the data processing arrangement signs the message in accordance with the plurality of sets of private-key material.

* * * * *